(12) United States Patent
Chen (10) Patent No.: US 9,965,853 B2
(45) Date of Patent: May 8, 2018

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Bin Chen, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/725,081

(22) Filed: May 29, 2015

(65) Prior Publication Data

US 2015/0348262 A1 Dec. 3, 2015

(30) Foreign Application Priority Data

Jun. 2, 2014 (JP) ................................. 2014-114372

(51) Int. Cl.
*G06T 7/00* (2017.01)
*G06T 7/11* (2017.01)
*G06T 7/64* (2017.01)

(52) U.S. Cl.
CPC .............. *G06T 7/0012* (2013.01); *G06T 7/11* (2017.01); *G06T 7/64* (2017.01); *G06T 2207/10081* (2013.01); *G06T 2207/30096* (2013.01)

(58) Field of Classification Search
None
See application file for complete search history.

(56) References Cited

U.S. PATENT DOCUMENTS

| 8,594,396 B2* | 11/2013 | Matsuda ............... G06T 7/0012 382/128 |
| 9,103,714 B2* | 8/2015 | Treado ...................... G01J 3/02 |
| 9,324,148 B2* | 4/2016 | Ishikawa ............... G06T 7/0028 |
| 2004/0211888 A1* | 10/2004 | Shur ......................... G01J 1/32 250/221 |
| 2005/0053270 A1 | 3/2005 | Kasai et al. |
| 2007/0223815 A1* | 9/2007 | Makram-Ebeid ........ G06K 9/34 382/173 |
| 2009/0202124 A1* | 8/2009 | Matsuda ............... G06T 7/0012 382/128 |
| 2010/0185090 A1* | 7/2010 | Suzuki ................. A61B 8/0858 600/443 |

(Continued)

FOREIGN PATENT DOCUMENTS

| JP | S60002986 A | 1/1985 |
| JP | 2000107183 A | 4/2000 |

OTHER PUBLICATIONS

The {LoG} Characteristic Scale: A Consistent Measurement of Lung Nodule Size in CT Imaging ; XP011296130;Diciotti et al 2010.*

(Continued)

*Primary Examiner* — Nancy Bitar
(74) *Attorney, Agent, or Firm* — Rossi, Kimms & McDowell LLP (57) ABSTRACT

An image processing apparatus for obtaining a shape of a region of a processing target included in an image, includes: an attribute obtaining unit configured to obtain a intensity distribution attribute of the region of the processing target; and a shape obtaining unit configured to obtain the shape of the region by a calculation method selected in accordance with the intensity distribution attribute.

21 Claims, 7 Drawing Sheets

(56) References Cited

U.S. PATENT DOCUMENTS

2014/0044328 A1* 2/2014 Matsuda .............. G06T 7/0012
382/128
2014/0133761 A1* 5/2014 Hikida ................ G06K 9/4604
382/199

OTHER PUBLICATIONS

Extended European Search Report issued in EP15169165.6, dated Nov. 17, 2015.
Chen et al., "A novel extracting blob-like object method based on scale-space", 2011 Fourth International Conference on Information and Computing, IEEE, Apr. 25, 2011, pp. 106-109, XP031895316, DOI: 10.1109/ICIC.2011.25, ISBN:978-1-61284-688-0.
Lindeberg, "Scale Selection Properties of Generalized Scale-Space Interest Point Detectors", Journal of Mathematical Imaging and Vision, Jun. 1, 2013, pp. 177-210, vol. 46, No. 2, XP55225226, DOI: 10.1007/s10851-012-0378-3, ISSN: 0924-9907.
S. Diciotti, et al., "The LoG Characteristic Scale: A Consistent Measurement of Lung Nodule Size in CT Imaging". IEEE Trans. Med. Imag., vol. 29(2), pp. 397-409, (2010).
K. Okada, "Ground-Glass Nodule Characterization in High-Resolution CT Scans". In Lung Imaging and Computer Aided Diagnosis. Taylor and Francis, LLC, pp. 1-28, (2011).
Office Action issued in Japanese Appln. No. 2014-114372 dated Jan. 29, 2018.
English translation of Office Action issued in Japanese Appln. No. 2014-114372 dated Jan. 29, 2018, cited in IDS filed on Feb. 9, 2018.

* cited by examiner

IMAGE PROCESSING APPARATUS, IMAGE PROCESSING SYSTEM, IMAGE PROCESSING METHOD, AND STORAGE MEDIUM

BACKGROUND OF THE INVENTION

Field of the Invention

The present invention relates to an image processing technique of processing a medical image.

Description of the Related Art

In recent years, the quality of medical images captured by three-dimensional imaging apparatuses such as a radiation computer tomography apparatus (radiation CT) and a nuclear magnetic resonance imaging apparatus (MRI) has dramatically improved, and it is therefore possible to obtain microscopic internal information of a human body. Accordingly, however, as the number of images increases, the burden on a radiologist in diagnostic interpretation increases every year, and expectations are increasingly running high for diagnosis support (Computer Aided Diagnosis: CAD). In diagnosis support for benign/malignant discrimination, therapeutic effect confirmation, or the like, it is important to estimate the shape of a target such as a tumor.

Concerning target shape estimation, for example, each of non-patent literatures 1 and 2 discloses a technique for estimating the shape of a pulmonary nodule that exhibits a convex mass as a region having a higher intensity value than in the periphery from a chest CT image using the scale space of a filter.

In non-patent literature 1 (S. Diciotti, et al., The LoG Characteristic Scale: A Consistent Measurement of Lung Nodule Size in CT Imaging. IEEE Trans. Med. Imag., Vol. 29(2), pp. 397-409, 2010), when applying a Laplacian of Gaussian (LoG) filter to a target in different scales (values of a function with respect to Gaussian $\sigma$), the local maximum of output values is obtained near the center point of the target. A scale corresponding to the obtained local maximum is selected as a parameter representing the shape of a pulmonary nodule (the diameter of an approximate sphere). Non-patent literature 2 (K. Okada: Ground-Glass Nodule Characterization in High-Resolution CT Scans. In Lung Imaging and Computer Aided Diagnosis. Taylor and Francis, LLC, 2011) discloses a technique of applying a Gaussian filter to a target in different scales and selecting most appropriate $\sigma$ from the output values. Also disclosed is calculating the eigenvalue of $\sigma$ using eigenvalue decomposition as a parameter representing the shape of a pulmonary nodule (approximate ellipse).

In a CT image, an isolated tumor region often exhibits a convex mass. However, there also exists a tumor region exhibiting a concave mass having a lower intensity value than in the periphery depending on the type of lesion or a cause such as contact with a neighboring organ. Also there exists a region including both a convex region and a concave region because of calcification, cavity, or the like. In the techniques of non-patent literatures 1 and 2, the shape is estimated assuming that the intensity distribution attribute of the target is known. For this reason, if the intensity distribution attribute of the target is not grasped in advance, it may be difficult to accurately obtain the outer shape of the target.

The present invention provides an image processing technique capable of accurately obtaining the shape of a target independently of the shape, texture, and relationship to a neighboring object.

SUMMARY OF THE INVENTION

According to one aspect of the present invention, there is provided an image processing apparatus for obtaining a shape of a region of a processing target included in an image, comprising: an attribute obtaining unit configured to obtain a intensity distribution attribute of the region of the processing target; and a shape obtaining unit configured to obtain the shape of the region by a calculation method selected in accordance with the intensity distribution attribute.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings. Note that the constituent elements described in the embodiments are merely examples. The technical scope of the present invention is determined by the scope of claims and is not limited by the following individual embodiments.

(First Embodiment)

An image processing apparatus according to this embodiment is an image processing apparatus 100 that obtains the shape of a region of a processing target included in an image. The image processing apparatus 100 includes an attribute obtaining unit 1020 that obtains the intensity distribution attribute of the region of the processing target, and a shape obtaining unit 1040 that obtains the shape of the region by a calculation method selected in accordance with the intensity distribution attribute. Obtaining the shape of the region means estimating the schematic shape of the region of the processing target. The image processing apparatus 100 further includes a selection unit 1030 that selects a calculation method to calculate the shape of the region of the processing target. The shape obtaining unit 1040 decides a parameter used to approximate the shape of the region by the selected calculation method and obtains the shape of the region approximated by the decided parameter.

The intensity distribution attribute is used as information to determine whether the region of the processing target is a convex region, a concave region, or a region including a convex region and a concave region. The attribute obtaining unit 1020 determines whether the intensity distribution attribute is information representing a mixed region. If the intensity distribution attribute is information representing a mixed region, the attribute obtaining unit 1020 obtains the component of the convex region and the component of the concave region in the mixed region.

The attribute obtaining unit 1020 uses, for example, Laplacian of Gaussian (LoG) as an evaluation function to obtain the intensity distribution attribute. The selection unit 1030 selects one of a calculation method corresponding to the convex region and a calculation method corresponding to the concave region based on the intensity distribution attribute. When the calculation method corresponding to the convex region is selected, the shape obtaining unit 1040 approximates the shape of the region based on a parameter representing the scale of the evaluation function corresponding to the maximum value out of the local maximums of the evaluation function. When the calculation method corresponding to the concave region is selected, the shape obtaining unit 1040 approximates the shape of the region based on a parameter representing the scale of the evaluation function corresponding to the minimum value out of the local minimums of the evaluation function.

The image processing apparatus 100 also includes a target image obtaining unit 1000 that obtains an image captured by the imaging apparatus, and a seed point obtaining unit 1010 that obtains a point belonging to a region of a processing target as a seed point. The attribute obtaining unit 1020 obtains the distribution of the power curves of the evaluation function for the region around the seed point using the seed point obtained by the seed point obtaining unit 1010 as a reference, and obtains the intensity distribution attribute using the distribution of the power curves.

This processing will be described later in detail with reference to FIGS. 3 to 6. A case where a lymph node on a CT image is used as a region of a processing target will be described below. However, the target organ and the types of the tumor and modality as the scope of the present invention are not limited to these. A detailed apparatus arrangement, functional arrangement, and processing procedure will be described below.

(Apparatus Arrangement)

Figure 1:
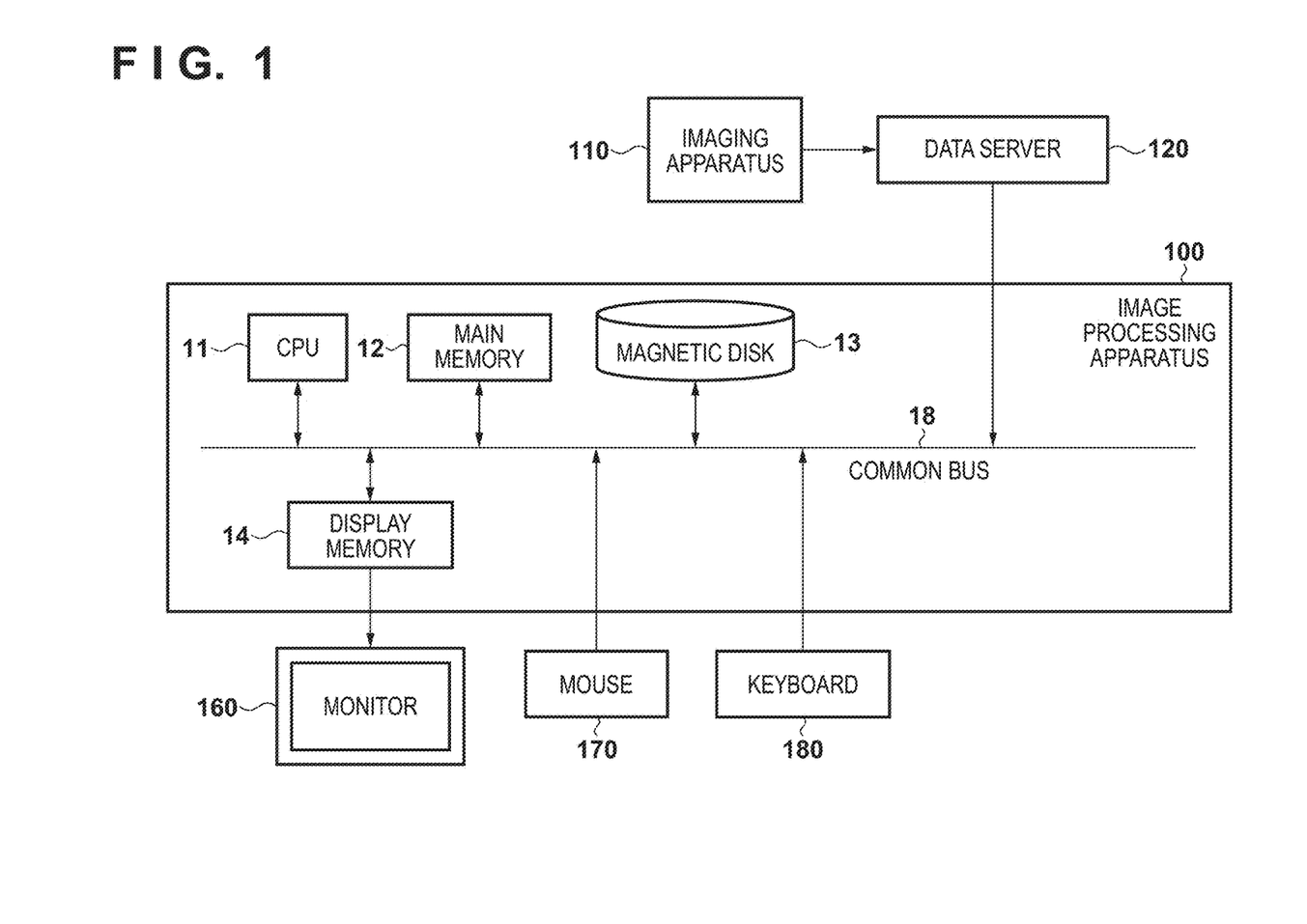
FIG. 1 is a block diagram showing the apparatus arrangement of an image processing system according to the first embodiment.

FIG. 1 is a block diagram showing the image processing apparatus according to the first embodiment and the system arrangement of an apparatus (image processing system) connected to it. The image processing system according to this embodiment includes the image processing apparatus 100, an imaging apparatus 110, a data server 120, a monitor 160 (display unit), and input units (a mouse 170 and a keyboard 180).

The image processing apparatus 100 can be implemented by a personal computer (PC) or the like, and includes a central processing unit (CPU) 11, a main memory 12, a magnetic disk 13, and a display memory 14. The CPU 11 mainly controls the operation of each constituent element of the image processing apparatus 100. The main memory 12 stores a control program to be executed by the CPU 11 or provides a work area for program execution by the CPU 11. The magnetic disk 13 stores various kinds of application software including an operating system (OS), device drivers of peripheral devices, and programs configured to perform region extraction processing and the like (to be described later). The display memory 14 temporarily stores display data for the monitor 160. The monitor 160 (display unit) is, for example, a CRT monitor or a liquid crystal monitor, and displays an image based on data from the display memory 14. The mouse 170 and the keyboard 180 which function as the input units perform pointing input and input of a character and the like by the user. The above-described constituent elements are communicably connected to each other by a common bus 18.

(Functional Arrangement)

Figure 2:
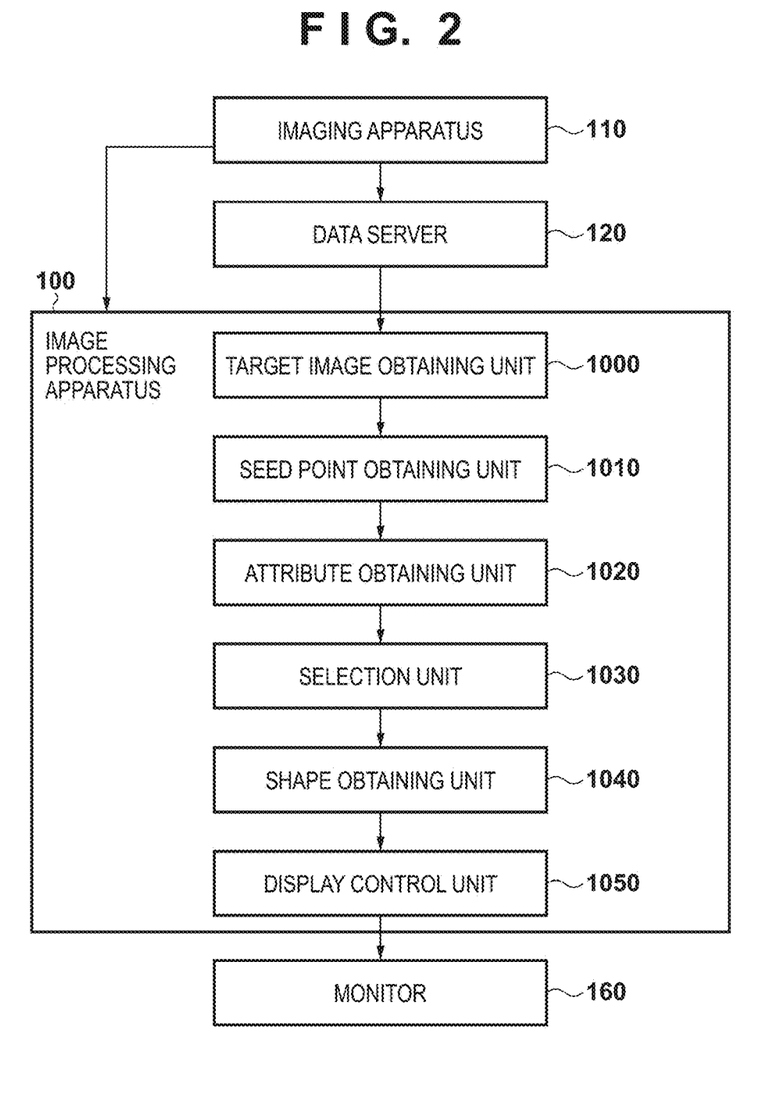
FIG. 2 is a block diagram showing the functional arrangement of the image processing system according to the first embodiment.

FIG. 2 is a block diagram showing the functional arrangement of the image processing system including the image processing apparatus 100 according to this embodiment. The image processing apparatus 100 according to this embodiment includes, as the functional arrangement, the target image obtaining unit 1000, the seed point obtaining unit 1010, the attribute obtaining unit 1020, the selection unit 1030, the shape obtaining unit 1040, and a display control unit 1050. The image processing apparatus 100 is connected to the data server 120 and the monitor 160.

An image to be processed by the image processing apparatus 100 is captured by the imaging apparatus 110. The imaging apparatus 110 includes, for example, a computer tomography apparatus (CT), a nuclear magnetic resonance imaging apparatus (MRI), and a radiography apparatus (digital radiography) that radiographs a two-dimensional radiation image. In this embodiment, a computer tomography apparatus (CT) will be described as an example. The imaging apparatus 110 is connected to the data server 120. The imaging apparatus 110 transmits an obtained CT image to the data server 120. The data server 120 is an apparatus configured to be able to hold the image (CT image) captured by the imaging apparatus 110.

The image processing apparatus 100 is configured to load necessary data from the data server 120 via a network, and can obtain image data stored in the data server 120. In addition, the image processing apparatus 100 is directly connected to the imaging apparatus 110 via the network, and can also obtain image data from the imaging apparatus 110. Note that connection of the apparatuses is not limited to the above example and may be done via another interface, for example, USB or IEEE1394. A storage device, for example, an FDD, CD-RW drive, MO drive, or ZIP drive may be connected to the image processing apparatus 100 that manages the data, and necessary data may be loaded from the drive.

The elements included in the image processing apparatus 100 will be described next. The target image obtaining unit 1000 shown in FIG. 2 obtains, from the data server 120, a CT image (three-dimensional grayscale image) associated with a subject (target case) to be processed by the image processing apparatus 100 and loads it into the image processing apparatus 100.

The seed point obtaining unit 1010 obtains information about the seed point of a region of a processing target (lymph node) based on the three-dimensional grayscale image obtained by the target image obtaining unit 1000.

Based on the seed point information and information about the intensity values of the obtained three-dimensional grayscale image, the attribute obtaining unit 1020 estimates whether the region of the processing target is a convex region, a concave region, or a region including a convex region and a concave region.

Based on information about the intensity distribution obtained by the attribute obtaining unit 1020, the selection unit 1030 selects a calculation method for calculating information about the shape of the region of the processing target (lymph node).

Based on the information about the intensity values of the three-dimensional grayscale image obtained by the target image obtaining unit 1000, the seed point information obtained by the seed point obtaining unit 1010, and the information about the intensity distribution attribute of the target obtained by the attribute obtaining unit 1020, the shape obtaining unit 1040 obtains information about the shape of the region of the processing target (lymph node) using the selected calculation method.

The display control unit 1050 outputs the shape information of the processing target region (lymph node) obtained by the shape obtaining unit 1040 to the monitor 160. The monitor 160 displays the calculation result of the shape information of processing target region (lymph node).

(Processing Procedure)

Figure 3:
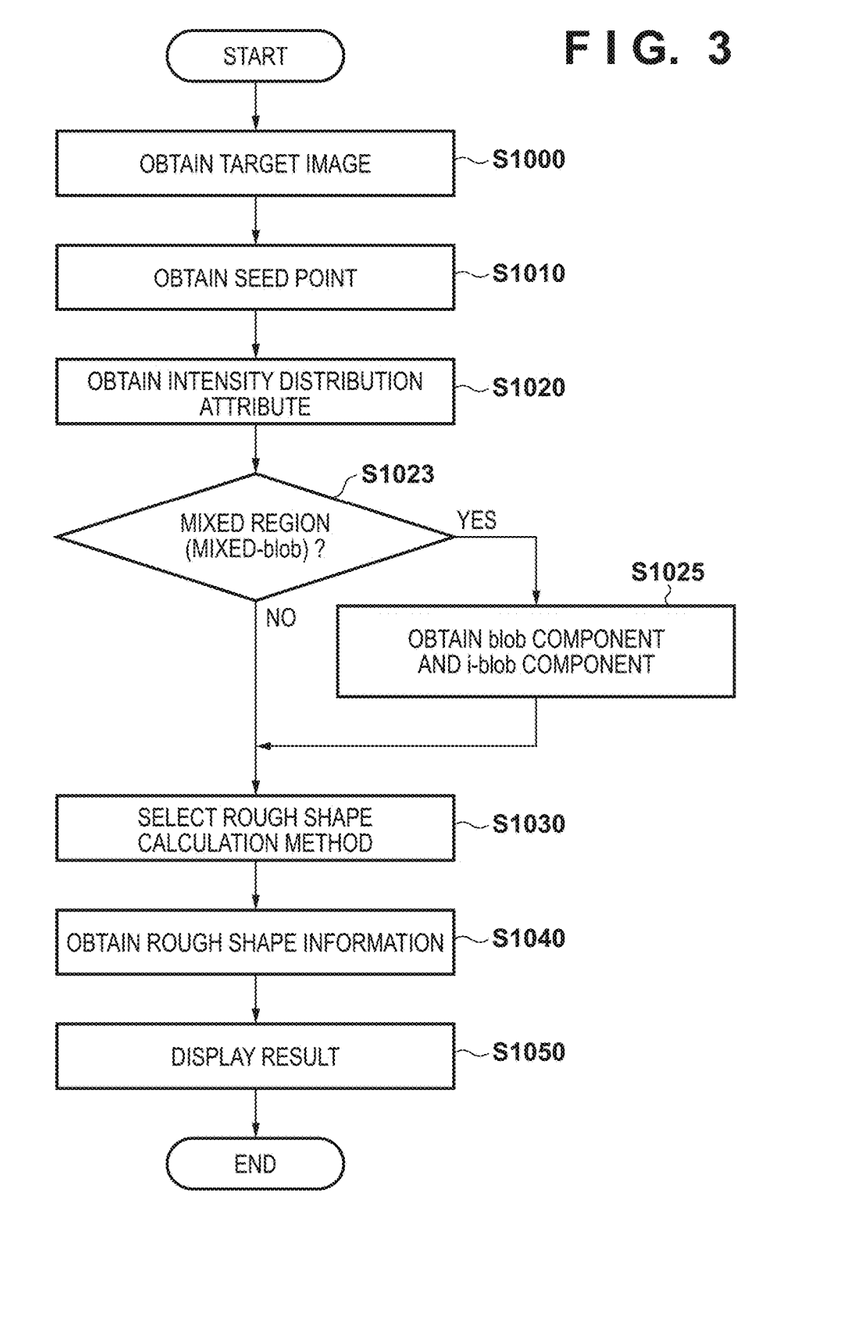
FIG. 3 is a flowchart showing the processing procedure of an image processing apparatus 100 according to the first embodiment.

An overall operation to be performed by the image processing apparatus 100 will be described next in detail with reference to FIG. 3. FIG. 3 is a flowchart showing the processing procedure to be executed by the image processing apparatus 100 according to this embodiment. In this embodiment, this flowchart is implemented by causing the CPU 11 to execute a program that is stored in the main memory 12 and implements the functional arrangement of each unit. The result of each process executed by the image processing apparatus 100 to be described below is stored in the main memory 12 and thus recorded. Processing of the image processing apparatus 100 according to this embodiment will be described below in detail with reference to FIG. 3.

Target image obtaining processing will be described first. In step S1000, the target image obtaining unit 1000 executes processing of obtaining, from the data server 120, a CT image of a case to be processed by the image processing apparatus 100 according to this embodiment, rasterizing the image on the main memory 12 of the image processing apparatus 100, and holding it.

In this embodiment, a case where a CT image of a target case is obtained will be described as an example. In this embodiment, this CT image is used as the target image. Here, the target image is a three-dimensional image obtained by capturing the interior of the target case by the imaging apparatus 110. More specifically, the three-dimensional image is formed from the pixel values (intensity values) of pixels three-dimensionally arrayed in an image region in an orderly manner. To define the image region, the size (pixel size) of each pixel on the real space is also added to the target image as additional information.

The target image according to this embodiment is formed from a plurality of pixels identifiable by the direction components of three axes (x, y, z) that are perpendicular to each other. The pixel size as the additional information is defined in each of the three axis directions. In this embodiment, a case where the pixel sizes in the three axis directions are r_size_x=1.0 mm, r_size_y=1.0 mm, and r_size_z=1.0 mm will be described in detail as an example.

Note that a intensity value of the target image can also be regarded as a function derived by referring to a pixel address in the three-dimensional array of pixels. In this embodiment, the target image is represented by a function I(x, y, z). Using the three-dimensional real-space coordinate values (x, y, z) of the imaging region of the target image as an argument, the function I(x, y, z) returns the pixel value at the position. The image processing apparatus 100 internally holds the target image as a set of pixels that form the target image. At this time, the pixels are recorded in a three-dimensional memory array. In this embodiment, the memory array to hold the target image is represented by I_mem(dx, dy, dz) in which dx, dy, and dz are integers representing addresses of the memory array. Position coordinates of the pixel indicated by the address on the real space of the imaging region are (dx×r_size_x, dy×r_size_y, dz×r_size_z). The ranges of the addresses dx, dy, and dz are 1≤dx≤Nx, 1≤dy≤Ny, 1≤dz≤Nz, respectively. The address ranges Nx, Ny, and Nz are directly related to the imaging range of the target image on the real space, and the imaging range is represented by (Nx ×r_size_x, Ny×r_size_y, Nz×r_size_z). Here, r_size_x, r_size_y, and r_size_z are pieces of information representing the pixel sizes in the three axis directions.

Seed point information obtaining processing will be described next. In step S1010, the seed point obtaining unit 1010 obtains a point belonging to the region of the processing target (lymph node) as a seed point $p\_{seed}$ ($x\_{seed}$, $y\_{seed}$, $z\_{seed}$).

The seed point obtaining unit 1010 obtains coordinates that, for example, the user manually inputs using the mouse 170 while referring to axial, sagittal, and coronal images displayed on the monitor 160. The seed point obtaining unit 1010 can correct the obtained seed point so that it becomes close to the center to gravity of the region of the processing target (lymph node) using, for example, a mean shift method presented by non-patent literature 2.

Intensity distribution attribute obtaining processing will be described next. In step S1020, the attribute obtaining unit 1020 obtains information about the intensity distribution attribute (a convex region, a concave region, or a mixed region including a convex region and a concave region) of the region of the processing target (lymph node). On a CT image, many lymph nodes exhibit regions (blobs) each having a convex mass. In some cases, however, a lymph node exhibits a concave region (i-blob) or a region (mixed-blob) including a convex region and a concave region. To calculate the shape information of the region of the processing target (lymph node), the intensity distribution attribute of the region of the processing target (lymph node) needs to be obtained in advance.

Figure 4A:
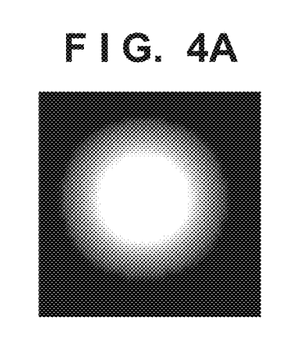
FIGS. 4A to 4F are views for explaining a intensity distribution attribute according to the first embodiment.
Figure 4B:
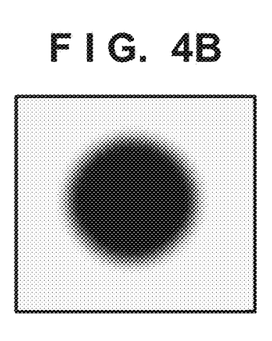
Figure 4C:
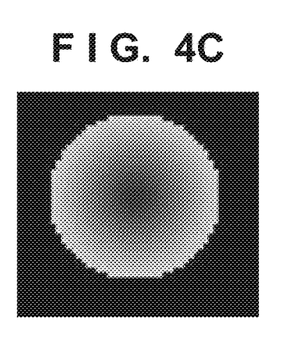

As a detailed example of this processing, a case where the intensity distribution attribute of the region of the processing target (lymph node) is estimated using the scale space of a Laplacian of Gaussian (LoG) kernel described in non-patent literature 2 will be described as an example. A detailed procedure will be described with reference to FIGS. 4A to 4F. FIG. 4A is a view showing a convex region (blob). FIG. 4B is a view showing a concave region (i-blob). FIG. 4C is a view showing a mixed region (mixed-blob) including a convex region and a concave region. Note that the LoG kernel is a technique described in non-patent literature 2 and the like, and a description thereof will be omitted.

Using the target image obtained in step S1000 and the seed point information obtained in step S1010, the attribute obtaining unit 1020 applies, to a local region I'(x, y, z) around the seed point $P\_{seed}$ based on the seed point, a LoG kernel in a multiscale represented by $$L(x,y,z,h)=I'(x,y,z)*LoG_h(r) \qquad (1)$$

where $r=\sqrt{(x^2+y^2+z^2)}$, h is a parameter representing the scale of the LoG kernel, and "*" represents convolution.

The attribute obtaining unit 1020 obtains the power curve of L(x, y, z, h) when the scale h of the LoG kernel is varied within a predetermined range {$h_{min}$ ... $h_{max}$}. Note that the user can designate $h_{min}$ and $h_{max}$ to arbitrary values. The attribute obtaining unit 1020 normalizes the output value using an output value obtained when h=0 as a reference value (0).

Figure 4D:
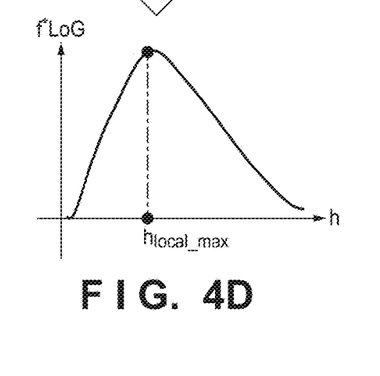

As shown in FIG. 4D, if the target is a convex region (blob), the attribute obtaining unit 1020 obtains the local maximum (local$_{13}$ max) of the power curve near the center of the target when h=D (D is the object size (diameter) of the target).

Figure 4E:
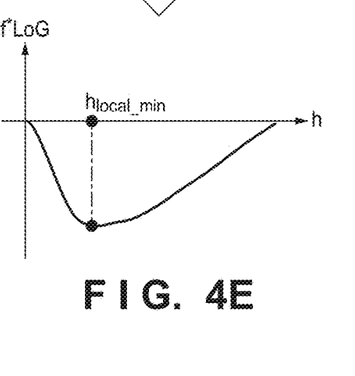

As shown in FIG. 4E, if the target is a concave region (i-blob), the attribute obtaining unit 1020 obtains the local minimum (local$_{13}$ min) of the power curve near the center of the target when h=D.

Figure 4F:
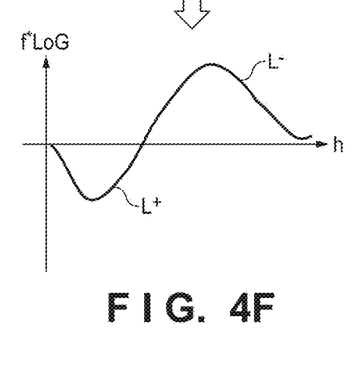

Note that a plurality of extreme values may appear due to the condition of the lesion such as a cavity or calcification, as shown in FIG. 4F. If a plurality of extreme values exist, the attribute obtaining unit 1020 determines that the region is a region (mixed-blob) including a convex region and a concave region. By the number of extreme values and the characteristics of the extreme values on the power curve, the attribute obtaining unit 1020 classifies the region of the processing target (lymph node) into a convex region, a concave region, or a mixed region, and the result of classification is used as the intensity distribution attribute information of the region of the processing target (lymph node). Note that the attribute obtaining unit 1020 can apply a smoothing process to the output value of L(x, y, z, h) to reduce noise.

In step S1023, the attribute obtaining unit 1020 determines whether the intensity distribution attribute information obtained in step S1020 represents a mixed region (mixed-blob). If the intensity distribution attribute information does not represent a mixed region (mixed-blob) (NO in step S1023), the attribute obtaining unit 1020 advances the process to step S1030. On the other hand, upon determining in step S1023 that the intensity distribution attribute information represents a mixed region (mixed-blob) (YES in step S1023), the attribute obtaining unit 1020 advances the process to step S1025.

In step S1025, the attribute obtaining unit 1020 obtains the component $V_{blob}$ of the convex region and the component $V_{i\text{-}blob}$ of the concave region in the mixed region (mixed-blob). Here, the components are pieces of information representing the relative sizes of the convex region and the concave region. For example, a case where the power curve of the LoG kernel L(x, y, z, h) when applying equation (1) is used for the mixed region (mixed-blob) shown in FIG. 4F will be described. The power curve distribution including the local maximum of L(x, y, z, h) is set to L$^+$, and the power curve distribution including the local minimum is set to L$^-$. The attribute obtaining unit 1020 obtains the maximum values of the absolute values of the extreme values on L$^+$ and L$^-$ (that is, the maximum value out of a plurality of local maximums on L$^+$ and the minimum value out of a plurality of local minimums on L$^-$) as $V_{blob}$ and $V_{i\text{-}blob}$. Alternatively, the average values of the absolute values of the extreme values on L$^+$ and L$^-$, the areas of L$^+$ and L$^-$, or the widths of the power curves corresponding to L$^+$ and L$^-$ along the abscissa may be obtained as $V_{blob}$ and $V_{i\text{-}blob}$. When $V_{blob}$ and $V_{i\text{-}blob}$ are obtained, the attribute obtaining unit 1020 advances the process to step S1030.

Processing of selecting a shape calculation method will be described next. In step S1030, based on the intensity distribution attribute information of the region of the processing target (lymph node) obtained by the attribute obtaining unit 1020, the selection unit 1030 selects a method (calculation method) of calculating the shape of the region of the processing target (lymph node). As the method (calculation method) of calculating a shape, two types of methods, that is, a method corresponding to a convex region (method for calculating a shape as a blob shape) and a method corresponding to a concave region (method for calculating a shape as an i-blob shape) are set.

If the intensity distribution attribute information obtained by the attribute obtaining unit 1020 represents a convex region (blob), the selection unit 1030 selects the method corresponding to the convex region. If the obtained intensity distribution attribute information represents a concave region (i-blob), the selection unit 1030 selects the method corresponding to the concave region.

If the intensity distribution attribute information represents a region including a convex region and a concave region, the selection unit 1030 selects a calculation method based on the component $V_{blob}$ of the convex region and the component $V_{i\text{-}blob}$ of the concave region in the mixed region obtained in step S1025. For example, the magnitude of $V_{blob}$ and that of $V_{i\text{-}blob}$ are compared. If $V_{blob}$ is larger than $V_{i\text{-}blob}$ the method corresponding to a convex region is selected. On the other hand, If $V_{i\text{-}blob}$ is larger than $V_{blob}$ the method corresponding to a concave region is selected.

In addition, if the intensity distribution attribute is information representing a mixed region, the selection unit 1030 selects the calculation method for calculating the shape of the region for the mixed region based on comparison between the component of the convex region and the component of the concave region. The selection unit 1030 may select the calculation method for calculating the shape of the region for the mixed region based on a result of comparison between a threshold and a ratio using the component of the convex region and the component of the concave region.

If the ratio of the component of the convex region to the component of the concave region is higher than the threshold, the selection unit 1030 selects the calculation method corresponding to the convex region. If the ratio of the component of the convex region to the component of the concave region is equal to or lower than the threshold, the selection unit 1030 selects the calculation method corresponding to the concave region. Detailed processing is as follows.

To select the method for calculating the shape for the mixed region, using the component $V_{blob}$ of the convex region and the component $V_{i\text{-}blob}$ of the concave region obtained in step S1025, the selection unit 1030 calculates the ratio between them by $$V = V_{blob}/V_{i\text{-}blob} \qquad (2)$$

The selection unit 1030 compares the value of the ratio V calculated by equation (2) with a predetermined threshold $V_t$. In accordance with the result of comparison, the selection unit 1030 selects the method corresponding to the convex region or the method corresponding to the concave region.

For example, if the ratio V calculated by equation (2) is higher than the threshold $V_t$, the selection unit 1030 selects the method (calculation method) corresponding to a convex region to calculate the shape of the region of the processing target (lymph node). If the ratio V is equal to or lower than the threshold ($V \leq V_t$), the selection unit 1030 selects the method (calculation method) corresponding to a concave region to perform processing of calculating the shape of the region of the processing target (lymph node). In this embodiment, threshold $V_t$=0.5. Note that the threshold $V_t$ can arbitrarily be set within the range of, for example, 0.0 to 1.0.

Processing of obtaining shape information will be described next. In step S1040, the shape obtaining unit 1040 executes processing of obtaining the shape information of the region of the processing target (lymph node) using the shape calculation method selected in step S1030. In this embodiment, a case where the shape is estimated using the power curve of the LoG kernel L(x, y, z, h) when applying equation (1) will be described as an example.

Figure 5:
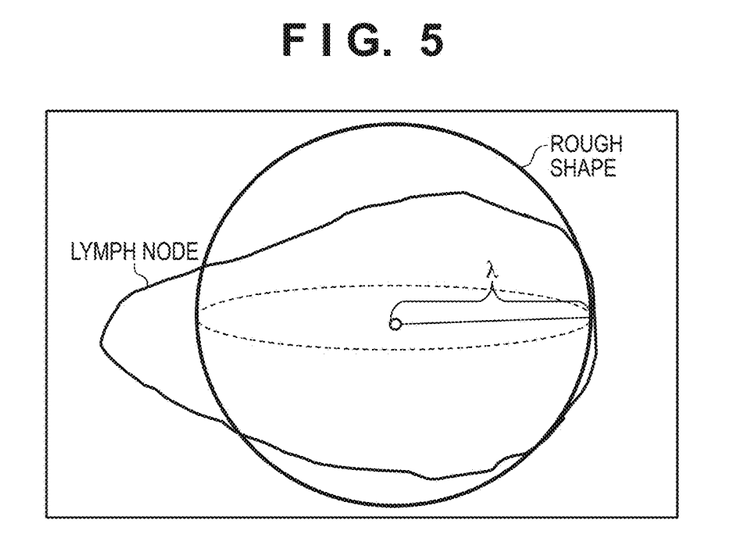
FIG. 5 is a view for explaining shape calculation according to the first embodiment.
Figure 6:
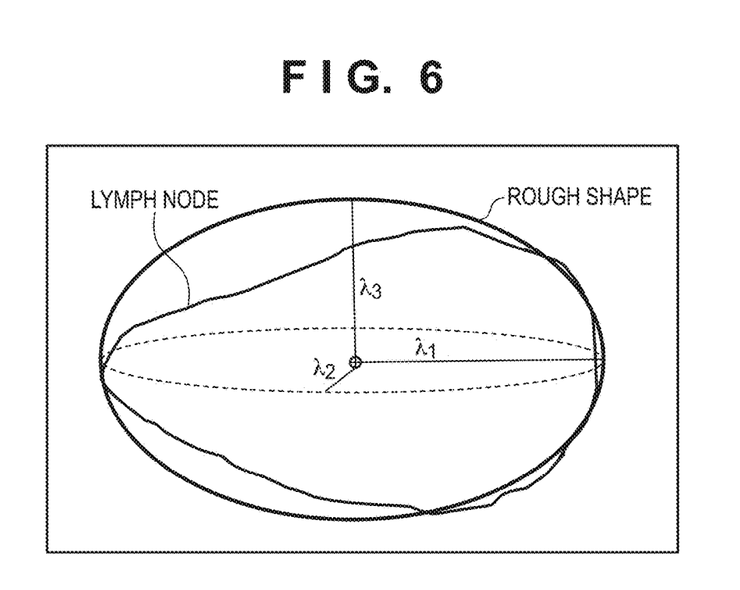
FIG. 6 is a view for explaining shape calculation according to the first embodiment.

When obtaining the shape using the method (calculation method) corresponding to a convex region, a scale $h_{local\_max}$ corresponding to the maximum value of the local maximums is set to the parameter representing the shape of the region of the processing target (lymph node) (a diameter d of an approximate sphere=2λ), as shown in FIG. 4D. When obtaining the shape using the method corresponding to a concave region, a scale $h_{local\_min}$ corresponding to the minimum value of the local minimums is set to the parameter representing the shape of the region of the processing target (lymph node) (the diameter d of an approximate sphere=2λ), as shown in FIG. 4E (FIG. 5). A plurality of parameters ($\lambda_1$, $\lambda_2$, $\lambda_3$) may be obtained from selected parameters using eigenvalue decomposition described in non-patent literature 2, and the three-dimensional shape of the region of the processing target (lymph node) may be approximated by an ellipsoid using the plurality of parameters, as shown in FIG. 6.

Calculation result display processing will be described next. In step S1050, the display control unit 1050 transmits information about the shape calculated in step S1040 to the monitor 160 connected to the image processing apparatus 100 and displays it. At this time, the display control unit 1050 displays an image (composite image) generated by superimposing and compositing a sphere having the obtained parameter representing the shape as the diameter and the original three-dimensional CT image using the seed point as the center of gravity. The display control unit 1050 can also execute processing of generating a two-dimensional sectional image taken along a predetermined plane.

The predetermined plane can be set interactively by, for example, the user using the mouse 170 or keyboard 180 functioning as the input unit. This makes it possible to display, at an arbitrary enlargement/reduction ratio, a sectional view generated by cutting, from a three-dimensional deformed image, an arbitrary region desired by the user at an arbitrary angle. The image display method is not limited to that described above. For example, the display control unit 1050 can also perform display control so as to volume-render and display a three-dimensional composite image.

(First Modification)

In the first embodiment, a case where the processing of obtaining the intensity distribution attribute of the region of the processing target (lymph node) is executed in step S1020 by an estimation method using the power curve of the LoG kernel applied in a multiscale has been described as an example. However, the present invention is not limited to this example. The intensity distribution attribute may be obtained based on a user's manual operation. For example, the user may trap a line belonging to the region of the processing target (lymph node) using the mouse 170 to obtain the intensity distribution information and estimate the intensity distribution attribute of the region of the processing target (lymph node) based on the information. Alternatively, the intensity distribution attribute of the region of the processing target (lymph node) may be estimated by, for example, Gaussian fitting described in non-patent literature 2. The processing of obtaining the intensity distribution attribute of the region of the processing target (lymph node) can accurately be performed, as in the first embodiment, using the arrangement of the first modification.

(Second Modification)

In the first embodiment, an arrangement has been described which uses a plurality of extreme values (maximum values or average values of the absolute values of extreme values) appearing in the power curve of the LoG kernel L(x, y, z, h) when obtaining the component of the convex region and the component of the concave region in step S1025. However, the gist of the present invention is not limited to this example. A power curve distribution including the first local maximum appearing in the power curve of the LoG kernel L(x, y, z, h) and a power curve distribution including the first local minimum may be selected for determination. In some cases, a plurality of local maximums and a plurality of local minimums appear in the power curve of the LoG kernel L(x, y, z, h) due to contact with an organ (peripheral organ) that is present around the region of the processing target (lymph node). Extreme values other than the first local maximum and the first local minimum are values concerning the peripheral organ in contact with the region of the processing target (lymph node) at a high possibility. For this reason, only a power curve distribution including the first local maximum and a power curve distribution including the first local minimum may be used out of the power curve of the LoG kernel L(x, y, z, h). The attribute obtaining unit 1020 may calculate the area of the power curve distribution $L^+$ including the local maximum and the area of the power curve distribution $L^-$ including the local minimum or the widths of the power curves corresponding to $L^+$ and $L^-$ along the abscissa.

The attribute obtaining unit 1020 selects only the power curve distribution including the first local maximum and the power curve distribution including the first local minimum out of the power curve of the LoG kernel L(x, y, z, h). The attribute obtaining unit 1020 obtains the component $V_{blob}$ of the convex region and the component $V_{i-blob}$ of the concave region. This processing makes it possible to accurately obtain the component $V_{blob}$ of the convex region and the component $V_{i-blob}$ of the concave region while reducing the load of arithmetic processing.

(Third Modification)

In the first embodiment, an arrangement has been described which uses the power curve distribution $L^+$ including the local maximum of the power curve of the LoG kernel L(x, y, z, h) and the power curve distribution $L^-$ including the local minimum to select the method for calculating the shape for a mixed region. In the first embodiment, an arrangement has been described which calculates the component $V_{blob}$ of the convex region and the component $V_{i-blob}$ of the concave region.

However, the gist of the present invention is not limited to this example. The component $V_{blob}$ of the convex region and the component $V_{i-blob}$ of the concave region may be calculated based on a threshold or a filtering value. For example, in the local region I'(x, y, z) around the seed point, each pixel having a intensity value larger than a threshold T is determined as a pixel belonging to a convex region, and each pixel having a intensity value equal to or smaller than the threshold T is determined as a pixel belonging to a concave region. The component $V_{blob}$ of the convex region and the component $V_{i-blob}$ of the concave region may be calculated based on the number of pixels of each region. Note that the value of the threshold T can be designated by the user or set using the intensity value of the seed point.

As a filter based on a Hesse matrix, the attribute obtaining unit 1020 can apply a filter capable of enhancing the convex region (blob) and the concave region (i-blob) to the local region I'(x, y, z) around the seed point. The attribute obtaining unit 1020 can also obtain the component $V_{blob}$ of the convex region and the component $V_{i-blob}$ of the concave region based on the maximum value of the output values of the filter or the number of enhanced pixels.

(Fourth Modification)

In the first embodiment, a case where in the processing of calculating shape information in step S1040, estimation is done using the power curve of the LoG kernel L(x, y, z, h) has been described as an example. However, the gist of the present invention is not limited to this example. The shape information may be calculated based on another filtering value.

For example, a filter (filter capable of enhancing the convex region and the concave region) based on a Hesse matrix may be applied to the region of the processing target (lymph node) in the multi scale $\{h_{min} \ldots h_{max}\}$ of the scale h of the LoG kernel. The scale h corresponding to the maximum value of the output values of the filter may be set to a parameter representing the shape of the region of the processing target (lymph node). A plurality of methods may be applied simultaneously, and the user may manually select a result assume to be closest to the actual result.

According to this embodiment, it is possible to accurately obtain the shape of a target independently of the shape, texture, and relationship to a neighboring object.

(Second Embodiment)

Figure 7:
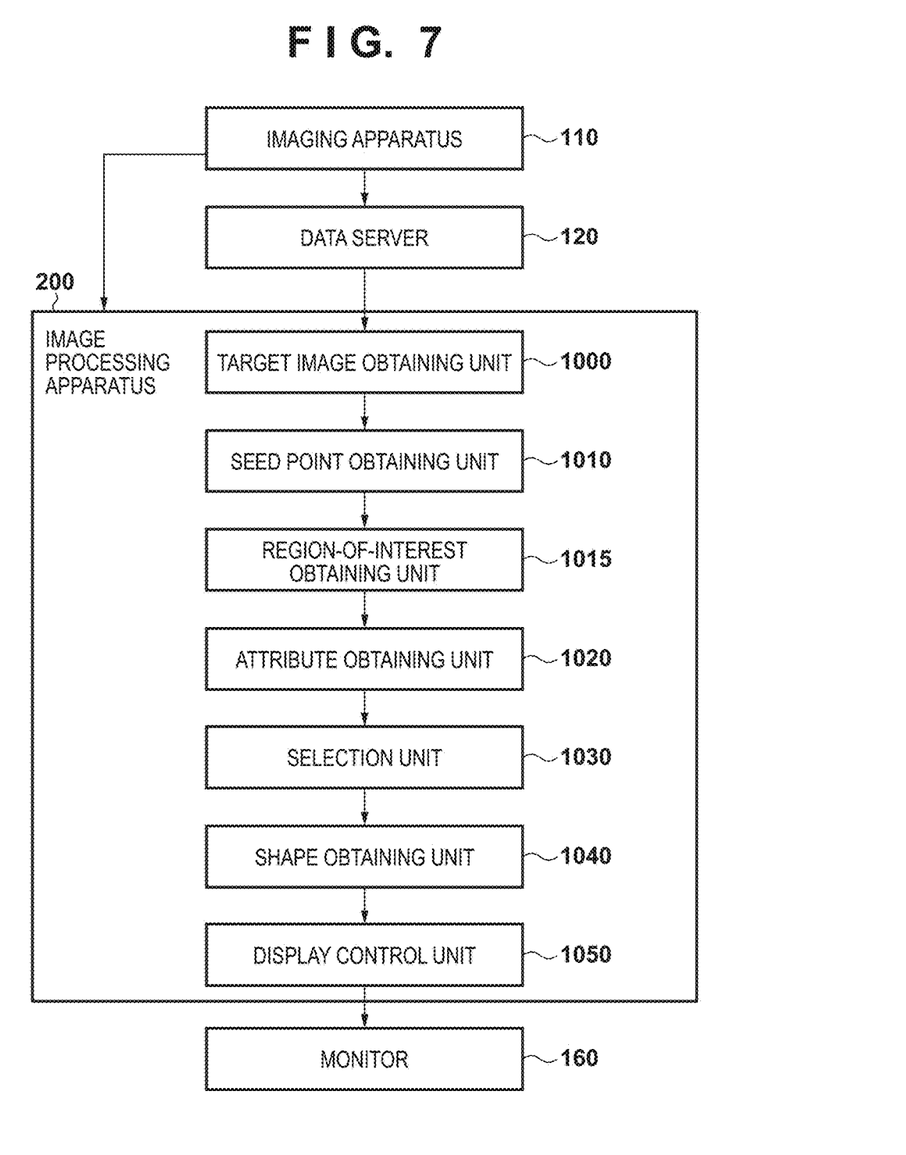
FIG. 7 is a block diagram showing the functional arrangement of an image processing system according to the second embodiment.

An image processing apparatus 200 configured to perform preprocessing such as obtaining a region of interest (VOI) of a region of a processing target (lymph node) and deletion of an unnecessary region will be described according to the second embodiment. The image processing apparatus 200 according to this embodiment further includes a region-of-interest obtaining unit 1015 that performs processing of specifying an unnecessary region not to be used to obtain the shape of a region from a region of interest including a region of a processing target and removing the unnecessary region from the region of interest. An attribute obtaining unit 1020 obtains the intensity distribution attribute of the region of the processing target included in the region of interest from which the unnecessary region has been removed. A shape obtaining unit 1040 obtains the shape of the region of the processing target by a calculation method according to the obtained intensity distribution attribute. The functional arrangement and processing procedure of the image processing apparatus 200 will be described below.

(Functional Arrangement)

FIG. 7 is a block diagram showing the functional arrangement of an image processing system including the image processing apparatus 200 according to this embodiment. The same reference numerals as in FIG. 2 denote constituent elements having the same functions as in the first embodiment, and a repetitive description thereof will be omitted. As shown in FIG. 7, the image processing apparatus 200 according to this embodiment includes, as the functional arrangement, a target image obtaining unit 1000, a seed point obtaining unit 1010, the region-of-interest obtaining unit 1015, the attribute obtaining unit 1020, a selection unit 1030, the shape obtaining unit 1040, and a display control unit 1050. In the image processing apparatus 200 according to this embodiment, the region-of-interest obtaining unit 1015 performs processing of specifying an unnecessary region from a region of interest including a region of a processing target and removing the unnecessary region from the region of interest, as described above. With this processing, an image region necessary to calculate the shape of the region of the processing target (lymph node) is obtained.

(Processing Procedure)

Figure 8:
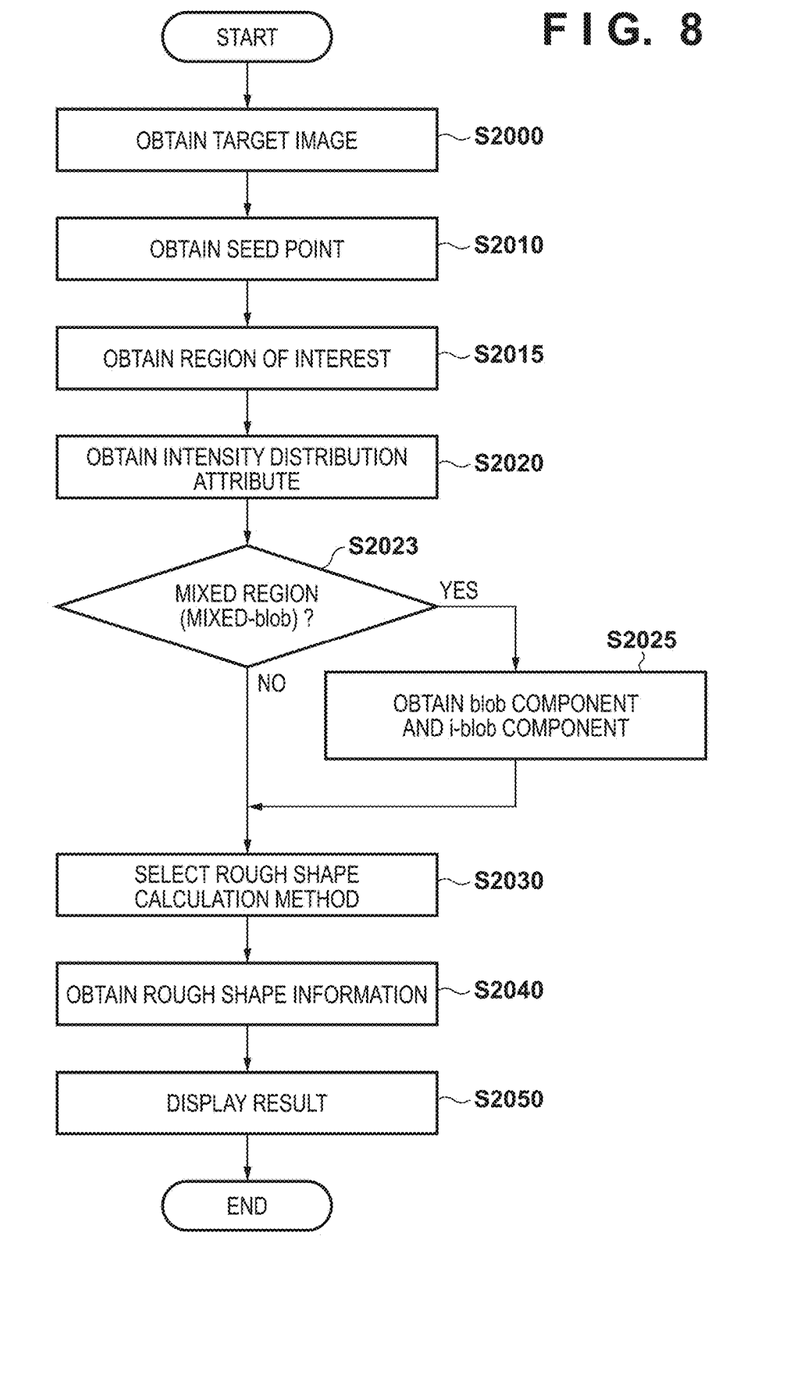
FIG. 8 is a flowchart showing the processing procedure of an image processing apparatus according to the second embodiment.

An overall operation to be performed by the image processing apparatus 200 will be described next in detail with reference to FIG. 8. The processes of steps S2000 and S2010 are the same as the processes of steps S1000 and S1010 described with reference to FIG. 3 of the first embodiment, and a description thereof will be omitted.

In step S2015, using the intensity value information of the image obtained in step S2000 and seed point information obtained in step S2010, the region-of-interest obtaining unit 1015 obtains an image region (region) necessary to calculate the shape of the region of the processing target (lymph node). The region-of-interest obtaining unit 1015 performs preprocessing of, for example, extracting an organ region where the region of the processing target (lymph node) exists and deleting extra regions such as blood vessel, bone, and other organ regions.

The region-of-interest obtaining unit 1015 stores region information representing the extra regions such as blood vessel, bone, and other organ regions in a main memory 12. The region-of-interest obtaining unit 1015 obtains a region (rectangular parallelepiped) surrounding the region of the processing target (lymph node) as the region of interest (VOI) while referring to the information of axial, sagittal, and coronal images.

The region-of-interest obtaining unit 1015 executes processing of removing the unnecessary region stored in the main memory 12 from the region of interest (VOI). Note that the region-of-interest obtaining unit 1015 can automatically execute the above-described processing such as organ extraction and extra region deletion by a method such as region extension or Level-set. The user may designate the organ and extra regions by manual input using a mouse 170 while referring to axial, sagittal, and coronal images displayed on a monitor 160.

The processes of steps S2020 to S2050 are the same as the processes of steps S1020 to S1050 described with reference to FIG. 3 of the first embodiment, and a repetitive description thereof will be omitted.

According to the above-described processing, it is possible to perform preprocessing to obtain the region of interest of the region of the processing target (lymph node). Hence, the processing from step S2020 is applied to the region after the unnecessary region is removed from the region of interest (VOI). The processing from step S2020 enables to execute obtaining the intensity distribution attribute, obtaining the component of a convex region and the component of a concave region, selecting a shape calculation method, and calculating shape information for the region excluding the unnecessary region within a more accurate range. It is therefore possible to accurately obtain the shape of a target independently of the shape, texture, and relationship to a neighboring object.

According to the above-described embodiment, it is possible to accurately obtain the shape of a target independently of the shape, texture, and relationship to a neighboring object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-114372, filed Jun. 2, 2014, which is hereby incorporated by reference herein in its entirety.

What is claimed is:

1. An image processing apparatus for obtaining a scale of a region of a processing target included in an image, comprising:
at least one processor; and
at least one memory storing a program including instructions executed by the at least one processor to:
obtain an intensity distribution attribute of the region of the processing target;
select, based on the intensity distribution attribute, a calculation method for calculating the scale of the region; and
obtain the scale of the region by the selected calculation method,
wherein the intensity distribution attribute defines whether the region of the processing target is a convex region which has a higher intensity value than its surrounding region, a concave region which has a lower intensity value than its surrounding region, or a mixed region including the convex region and the concave region, and
wherein, if the intensity distribution attribute defines the region as the mixed region, a component of the convex region and a component of the concave region in the mixed region are obtained, and the calculation method for calculating the scale of the region for the mixed region is selected based on a comparison between the obtained component of the convex region and the obtained component of the concave region.

2. The apparatus according to claim 1, wherein the at least one processor executes instructions to determine a parameter to approximate the scale of the region by the calculation method and obtain the scale approximated by the parameter.

3. The apparatus according to claim 1,
wherein a Laplacian of Gaussian (LoG) function is used as an evaluation function to obtain the intensity distribution attribute, and
wherein the components of the convex region and the concave region are obtained using a local maximum and a local minimum obtained from a distribution of a power curve of the evaluation function.

4. The apparatus according to claim 3, wherein if the power curve includes a plurality of local maximums and a plurality of local minimums, the components of the convex region and the concave region are obtained using a maximum value out of the plurality of local maximums and a minimum value out of the plurality of local minimums.

5. The apparatus according to claim 1, wherein if the component of the convex region with respect to the component of the concave region is larger than a threshold, a calculation method corresponding to the convex region is selected, and
if the component of the convex region with respect to the component of the concave region is not more than the threshold, a calculation method corresponding to the concave region is selected.

6. The apparatus according to claim 1,
wherein a Laplacian of Gaussian (LoG) function is used as an evaluation function to obtain the intensity distribution attribute,
wherein a calculation method corresponding to the convex region or a calculation method corresponding to the concave region is selected based on the intensity distribution attribute,
wherein if the calculation method corresponding to the convex region is selected, the scale of the region is approximated based on a parameter representing a scale of the evaluation function corresponding to a maximum value of local maximums of the evaluation function, and
if the calculation method corresponding to the concave region is selected, the scale of the region is approximated based on a parameter representing a scale of the evaluation function corresponding to a minimum value of local minimums of the evaluation function.

7. The apparatus according to claim 1, wherein the at least one processor further executes instructions to perform processing of specifying an unnecessary region not to be used to obtain the scale of the region from a region of interest including the region of the processing target and removing the unnecessary region from the region of interest, and
wherein the intensity distribution attribute of the region of the processing target included in the region of interest from which the unnecessary region has been removed is obtained.

8. The apparatus according to claim 3, wherein the at least one processor further executes instructions to obtain a point belonging to the region of the processing target as a seed point, and
wherein the distribution of the power curve of the evaluation function for a region around the seed point is obtained using the seed point as a reference.

9. The apparatus according to claim 1, wherein the at least one processor further executes instructions to display, on a display unit, an image generated by superimposing and compositing the obtained scale and the image captured by an imaging apparatus.

10. The apparatus according to claim 1, wherein the image is captured by an imaging apparatus, and the imaging apparatus includes a computer tomography apparatus, a nuclear magnetic resonance imaging apparatus, or a radiography apparatus that radiographs a two-dimensional radiation image.

11. An image processing method of obtaining a scale of a region of a processing target included in an image, the method performed by an image processing apparatus including one or more processors, the method comprising:

using the one or more processors to obtain an intensity distribution attribute of the region of the processing target;

using the one or more processors to select, based on the intensity distribution attribute, a calculation method for calculating the scale of the region; and using the one or more processors to obtain the scale of the region by the selected calculation method, wherein the intensity distribution attribute defines whether the region of the processing target is a convex region which has a higher intensity value than its surrounding region, a concave region which has a lower intensity value than its surrounding region, or a mixed region including the convex region and the concave region, and wherein, if the intensity distribution attribute defines the region as the mixed region, a component of the convex region and a component of the concave region in the mixed region are obtained, and the calculation method for calculating the scale of the region for the mixed region is selected based on a comparison between the obtained component of the convex region and the obtained component of the concave region.

12. The apparatus according to claim 1, wherein the scale of the region includes a diameter of the region.

13. The apparatus according to claim 1, wherein the mixed region is the convex region which further includes the concave region.

14. An image processing apparatus for obtaining a scale of a region of a processing target included in an image, comprising:

at least one processor; and at least one memory storing a program including instructions executed by the at least one processor to:

obtain an intensity distribution attribute of the region of the processing target;

select one of calculation methods corresponding to the obtained intensity distribution attribute; and obtain the scale of the region by the selected calculation method, wherein the intensity distribution attribute defines whether a type of the region is a convex region, a concave region, or a mixed region including the convex region and the concave region, based on an intensity distribution of the region, and wherein, if the intensity distribution attribute defines the type of the region as the mixed region, a component of the convex region and a component of the concave region in the mixed region are obtained, and the calculation method for calculating the scale of the region for the mixed region is selected based on the obtained component of the convex region and the obtained component of the concave region.

15. The apparatus according to claim 14, wherein the intensity distribution attribute is obtained by applying a process to the region of the processing target.

16. The apparatus according to claim 14, wherein one of a calculation method corresponding to the convex region and a calculation method corresponding to the concave region is selected.

17. The apparatus according to claim 14, wherein the mixed region is the convex region which further includes the concave region.

18. An image processing method of obtaining a scale of a region of a processing target included in a image, the method performed by an image processing apparatus including one or more processors, the method comprising:

using the one or more processors to obtain an intensity distribution attribute of the region of the processing target;

using the one or more processors to select one of calculation methods corresponding to the obtained intensity distribution attribute; and using the one or more processors to obtain the scale of the region by the selected calculation method, wherein the intensity distribution attribute defines whether a type of the region is a convex region, a concave region, or a mixed region including the convex region and the concave region, based on an intensity distribution of the region, and wherein, if the intensity distribution attribute defines the type of the region as the mixed region, the one or more processors obtain a component of the convex region and a component of the concave region in the mixed region, and select the calculation method for calculating the scale of the region for the mixed region based on the obtained component of the convex region and the obtained component of the concave region.

19. The method according to claim 18, wherein the one or more processors obtain the intensity distribution attribute by applying a process to the region of the processing target.

20. The method according to claim 18, wherein the one or more processors select one of a calculation method corresponding to the convex region or a calculation method corresponding to the concave region.

21. The method according to claim 18, wherein the mixed region is the convex region which further includes the concave region.

* * * * *